Figure 1:
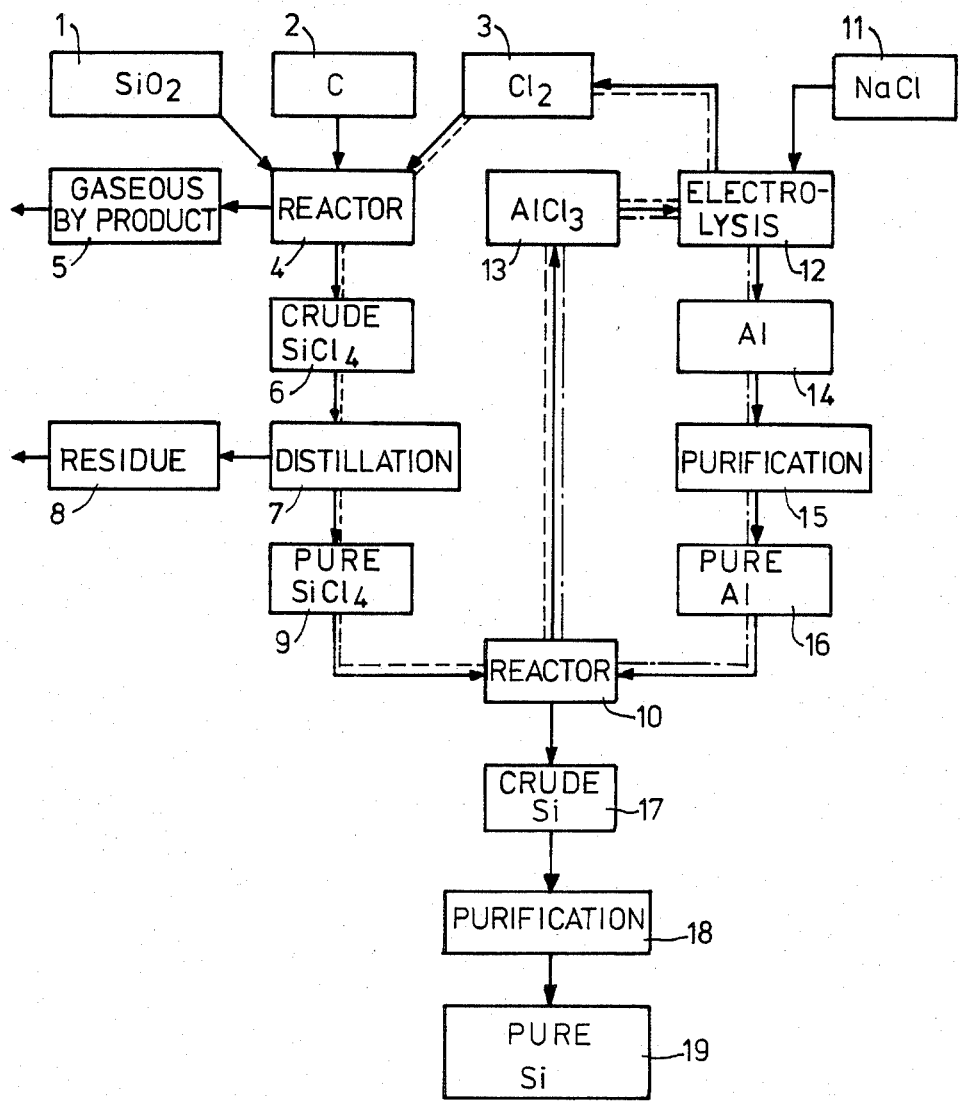

United States Patent [19]

Woditsch et al.

[11] Patent Number: 4,525,334
[45] Date of Patent: Jun. 25, 1985

[54] PROCESS FOR THE PRODUCTION OF SILICON

[75] Inventors: Peter Woditsch; Martin Abels; Berthold Brazel, all of Krefeld, Fed. Rep. of Germany

[73] Assignee: Bayer Aktiengesellschaft, Leverkusen, Fed. Rep. of Germany

[21] Appl. No.: 589,204

[22] Filed: Mar. 13, 1984

[30] Foreign Application Priority Data

Mar. 24, 1983 [DE] Fed. Rep. of Germany ....... 3310828

[51] Int. Cl.$^3$ .............................................. C01B 33/00
[52] U.S. Cl. ................... 423/324; 423/348; 423/349; 423/350; 423/495
[58] Field of Search ........................ 423/324, 348–350, 423/495

[56] References Cited

U.S. PATENT DOCUMENTS 4,172,883 10/1979 Ingle et al. ......................... 423/348

FOREIGN PATENT DOCUMENTS

0001943A1 5/1979 European Pat. Off. ............ 423/349
39065 5/1964 Japan ................... 423/350
0011815 1/1982 Japan ................... 423/349

OTHER PUBLICATIONS

Chemical Abstracts, Bd. 57, No. 3, (Aug. 1962), Shiro Yoshizawa "Reduction of Silicon Tetrachloride with Aluminum", pp. 3076–3077.
"Nouveau Traite de Chimie Minerale", Paul Pascal; Band VIII, Tome VIII, Silicum, pp. 275–280. Masson et Cie. (1965).
Kirk-Othmer, Encyclopedia of Chemical Technology, vol. 2, p. 161, (1978).

Primary Examiner—Gary P. Straub
Assistant Examiner—Jackson Leeds
Attorney, Agent, or Firm—Sprung, Horn, Kramer & Woods

[57] ABSTRACT

A process for the production of silicon comprising reacting a gaseous silicon compound of the formula $SiH_nX_{4-n}$, wherein X is halogen and n is 0 to 3, with aluminum in solid state. The resulting silicon can be highly pure and will have the particle size of the aluminum feed, making it especially useful for production of solar cells.

5 Claims, 1 Drawing Figure

PROCESS FOR THE PRODUCTION OF SILICON

This invention relates to a process for the production of silicon by the reaction of silicon compounds corresponding to the following general formula: $SiH_nX_{4-n}$, wherein X represents halogen and n may assume values of from 0 to 3; with aluminum.

There has been no lack of attempts in recent years to utilize solar energy in the terrestrial region by photovoltaic generation of current. The raw material used for this purpose has hitherto been almost exclusively semi-conductive silicon, the production of which is known from the field of semi-conductor technology.

Thus, silicon is obtained by the classical Siemens-Wacker process in which quartz is first reduced to crude silicon using coal. This crude silicon is then reacted with hydrogen chloride to form trichlorosilane, from which a highly pure polycrystalline semi-conductive silicon is separated by reduction with hydrogen on highly heated silicon rods after distillative purification.

Monocrystalline silicon is obtained by various methods of crucible pulling or zonal melting, possibly in the presence of doping substances. Discs about 400 μm in thickness obtained by sawing may be used as starting material for semi-conductor structural elements or for solar cells.

Although the material costs of these discs are of minor importance in the semi-conductor industry, they are of decisive importance in photovoltaics. At a given intensity of solar radiation, the electric output of a solar cell is proportional to its surface area so that a solar cell of 100 cm² having a degree of efficiency of 10% supplies on average about 2 kWh/yrs. Commercial solar cells based on high cost semi-conductive silicon are therefore much too expensive to be able to compete with conventional sources of energy for terrestrial use.

For space flight, the development of photovoltaics has made successful progress and solar cells have become established as reliable and competitive devices for covering the energy requirements in the cosmic field. Photovoltaics may contribute to the solution of present day terrestrial energy problems if success is achieved in developing solar cells, which, as regards cost and efficiency, are able to compete with conventional sources of energy. One fundamental condition for utilizing solar energy on a large scale is therefore the provision of an economic process for the production of silicon of a sufficient degree of purity to meet the requirements of solar cell silicon.

Silicon may be obtained economically on a large scale by the metallurgical process of reduction of quartz sand with carbon in an arc furnace, but silicon produced by this method has a degree of purity of only 98 to 99% and therefore does not satisfy the requirements of a semi-conductor in solar cells. Apart from metallic impurities, in particular iron, this silicon contains inter alia elements of the III and V Main Groups of the Periodic Table, of which boron and phosphorus have a decisively adverse effect on the specific conductivity of silicon as semi-conductive material.

According to DE-A 3,013,319, very pure silicon may be obtained by the reaction of a highly pure quartz sand with reducing agents containing carbon. According to DE-A 2,623,413, metallurgically-obtained silicon may be subjected to a purification process.

EP-A 0 029 182 describes a semi-continuous process for the production of pure silicon. The silicon is obtained in a cyclic process by the reduction using aluminum, of finely divided quartz sand dissolved in aluminum sulphide slags. The silicon dissolved in excess aluminum is separated by crystallization and the resulting $Al_2O_3$ is withdrawn from the slags and subjected to electrolysis for recovery of the aluminum.

According to another possible method, silicon halides, which are easily purified, are converted to pure silicon by reaction with metallic reducing agents.

Thus, $SiF_4$ (Stanford Research Institute: Mater. Res. Bull., 16 (4), 437 (1981)) or $SiCl_4$ (DE-A 2,800,254) is reduced to pure silicon by reaction with metallic sodium in the gaseous phase.

U.S.-C No. 3,012,862 discloses a process for the production of silicon from $SiCl_4$ using zinc vapour.

None of the processes mentioned above is satisfactory, particularly on economic grounds, for the large scale production of silicon for solar cells.

It is therefore an object of the present invention to provide a process by which pure silicon suitable for solar cells may be obtained economically.

These requirements have surprisingly been able to be fulfilled by a process in which silicon halides are reacted with aluminum present in the solid state to form silicon and aluminum halide.

The present invention thus relates to a process for the production of silicon by the reaction of silicon compounds corresponding to the following general formula: $SiH_nX_{4-n}$, wherein X represents halogen and n may assume values of from 0 to 3; with aluminum, characterized in that the aluminum used in the reaction is in the solid state and the silicon compounds are in the gaseous state.

In one particularly preferred embodiment of the present process, the temperatures during the reaction are below the melting point of aluminum.

In the process according to the present invention, the preferred reaction temperatures are from 500° to 660° C., temperatures from 550° to 650° C. being particularly preferred.

During the individual phases of the reaction, the temperature should be controlled according to the melting point of the existing Al/Si ratio, in particular the Al/Si eutectic point, so that the reactor at all times contains only gases and solids. The reaction should therefore be started at temperatures below 570° C. and may be raised as the reaction progresses. A temperature of 660° C. is generally sufficient for obtaining a quantitative reaction.

If desired, the temperature employed in the process according to the present invention may be varied stepwise. For example, a partial reaction may be carried out in a first reaction step to produce a partially reacted product having an Al/Si ratio of less than 4. This partially reacted product may subsequently be reacted with further quantities of silicon halides or with silanes $SiH_nX_{4-n}$ in one or more reaction steps until complete conversion of the metallic aluminum has taken place.

With increasing solidification point of the prevailing Al/Si ratio, the reaction temperatures may be raised considerably above the melting point of pure aluminum, 660° C.

The process according to the invention does not depend on the use of a particular silicon halide, halogen silane or silane or a particular two- or multi-component mixture thereof and also does not depend on the method of their preparation of their recovery from a particular chemical or physical process. In the context of the invention the halogens are understood to be fluorine, chlorine, bromine and iodine.

Thus the silicon halide $SiCl_4$ can be obtained from quartz or a $SiO_2$-containing substance by reaction with carbon and chlorine or phosgene. $SiCl_4$ can also be prepared by reacting metallurgical silicon with chlorine or hydrogen chloride. Silicon halide and halogen silane can also be produced for example from the distillation residue or the residue of the catalyst mass used in the Rochon synthesis. The undesired by-products and automatically occurring products of the conventional Siemens-Wacker process can be used for the preparation of Si for solar cells.

The process according to the present invention does not depend upon the use of a particular silicon halide, halogen silane or silane. For the present purposes, "halogens" are to be understood to comprise fluorine, chlorine, bromine and iodine.

The supply of gaseous silicon compounds to the reaction may be carried out in a pure atmosphere or in combination with inert gases which do not participate in the reaction, such as $N_2$, Ar, or $SF_6$, and the partial pressure of the silicon compound may vary within wide limits. The silicon compound is preferably provided in excess for the sake of a more rapid reaction and hence reduced dwell times of the products in the reactor.

In one particularly preferred embodiment, however, the silicon compound used is silicon tetrachloride, $SiCl_4$. When $SiCl_4$ purified by distillation is reacted with pure aluminum pure silicon is obtained in addition to $AlCl_3$. This embodiment may provide the basis of an elegant cyclic method of carrying out the process according to the present invention, which may be carried out economically on a very large technical scale without ecological problems.

The drawing is a schematic flow sheet of a cyclic process in accordance with the present invention, comprising a "chlorine cycle" on the left and an "aluminum cycle" on the right.

Starting with $SiO_2$ (1), carbon (2) and chlorine (3), a reaction (4) is carried out in known manner and, after removal of the gaseous reaction products (5), such as carbon monoxide, a crude product (6) consisting for the most part of $SiCl_4$ is obtained, and this is separated in distillation step (7) into a residue (8) and pure $SiCl_4$ (9). This $SiCl_4$ (9) is then employed for the reaction (10) with aluminum. Both the $AlCl_3$ (13) formed in this reaction and NaCl (11) are subjected to electrolysis (12) whereby the chlorine requirement (3) for the process is covered and crude aluminum (14) is obtained. This aluminum (14) is purified at stage (15) to yield pure aluminum (16) which is reacted with $SiCl_4$ (9) at stage (10) to form $AlCl_3$ (13) as mentioned above and crude silicon (17). After suitable working-up (18), silicon (19) which satisfies the high requirements of purity is obtained.

In the above cyclic process, $SiO_2$ and carbon are the educts and elementary silicon is the end product.

A wide variety of processes may be regarded as alternatives to the electrolysis of aluminum chloride. $AlCl_3$ could be used in organic syntheses in which there is a high demand therefor.

The aluminum required may be used in virtually any reactive or analytical quality in the process according to the present invention.

It is particularly preferred, however, to use a finely divided aluminum having a BET surface of more than 0.05 $m^2/g$, preferably from 0.1 to 0.2 $m^2/g$. It is immaterial by what means the aluminum is obtained in this fine degree of subdivision, e.g. by mechanical methods, such as scraping, filing or grinding, or by the atomization of liquid aluminum with gases.

One particular characteristic of the process according to the present invention is that the silicon obtained resembles in its outer form the finely divided aluminum put into the process. The present process thus leads to an enantiomorphic conversion of aluminum into silicon and thus circumvents the problems of similar reactions in which the conversion takes place in the gaseous phase.

The silicon is thus obtained in a relatively coarse form whereas coarse-grained silicon is very difficult to obtain from reactions of silicon halides in the gaseous phase (U.S.-C No. 3,012,862).

The process according to the present invention may be carried out regardless of the analytical degree of purity of the aluminum put into the process. Aluminum obtained by electrolysis, preferably having a degree of purity of from 99.5 to 99.9%, may be used. The degree of purity of the aluminum used does, of course, have some influence on the degree of purity of the silicon obtained. The purity of the silicon obtainable by the process according to the present invention depends on the aluminum, the silicon halide and the installations used for its production. The higher the degree of purity of silicon required, the purer should be the starting materials and the more care must be taken in the choice of materials used for the reactors.

The reaction of silicon compounds with aluminum may be carried out in various reactors. It may be carried out batchwise in a solid bed reactor or in a fluidized bed reactor. Continuous reaction processes may be carried out in rotary plate furnaces, annular kilns or, in particular, revolving tubular furnaces. The whole reaction process may also be carried out in a combination of various reactors, either continuously or batchwise. The reactors must be lined with materials which are thermally, mechanically and chemically resistant both to the reaction educts and to the reaction products.

The silicon prepared by the process according to the present invention may be used for the production of monocrystalline or polycrystalline silicon blocks, either immediately or after a further conventional purification, such as acid leaching.

A particular advantage of the process according to the present invention lies in the degree to which the silicon is free from boron and phosphorus, the two elements which give rise to the greatest problems in the purification of metallurgic silicon. If suitable raw materials are used, both these elements are present in quantities below a threshold of 1 ppm. The present invention also relates to the use of silicon obtained by the present process in the production of solar cells.

Particular advantages of the process according to the present invention lie in the low energy requirement, resulting from the comparatively low reaction temperatures, and the consequent low thermal stress on the material. A further advantage is that the silicon obtained does not require a specialized or elaborate separation of by-products since the aluminum chloride formed is removed during the reaction by sublimation.

Furthermore, the possibility of obtaining the silicon in the form of such coarse particles ensures problem-free handling during subsequent processing.

The following examples serve to illustrate the present invention.

EXAMPLE 1

20 g of aluminum filings are uniformly distributed in an "Alsint" annealing box having a bottom surface area of about 50 cm² and are heated to 550° C. in an electrically heated Alsint tube under a nitrogen atmosphere. Gaseous $SiCl_4$ is then passed over and the temperature is steadily raised to about 650° C. until the end of the reaction time. After 3 hours, the aluminum put into the process has been almost completely converted to $AlCl_3$. The $AlCl_3$ which has sublimed is carried away with excess $SiCl_4$ and condensed in suitable receivers. The silicon formed in the stoichiometric quantity remains in the annealing box in the form of an easily broken down crystal cake. The silicon obtained has a boron content of <0.5 ppm and a phosphorus content of <1 ppm.

EXAMPLE 2

Aluminum is reacted as described in Example 1, but using trichlorosilane, $SiHCl_3$, instead of $SiCl_4$.

Silicon is again obtained as reaction product in the stoichiometric quantity and its particle size corresponds to that of the aluminum put into the process. The silicon obtained has a boron content of <0.5 ppm and a phosphorus content of <1 ppm.

EXAMPLE 3

Coarse aluminum powder is fluidized in a quartz tube equipped with a gassing frit by the injection of nitrogen. The fluidized bed is heated by an electric furnace surrounding the reactor and by a preheated stream of gas. When a temperature of 400° C. is reached, $SiCl_4$ delivered from a dosing pump is introduced into the stream of nitrogen by way of an evaporator and the $N_2/SiCl_4$ ratio changes in favour of $SiCl_4$ in the course of the operating time. The reaction gases are discharged through condensation devices (receivers for $AlCl_3$ and cooling traps for unreacted $SiCl_4$). After a reaction time of from 3 to 4 hours with a final temperature of 650° C., the reactor contents consist of Si in the form of crystal agglomerates. The boron content of this silicon is found to be less than 0.5 ppm and that of phosphorus less than 1 ppm.

EXAMPLE 4

A revolving tubular furnace lined with Alsint is continuously charged with coarse aluminum powder at a temperature of from 550° to 650° C. and the aluminum powder is contacted with $SiCl_4$ in counter-current. The angle of inclination and speed of rotation of the furnace are adjusted to ensure a dwell time in the heated zone of the furnace of from 2.5 to 3 hours. The reaction gases are discharged from the top end of the revolving tube by way of condensation apparatus.

At the discharge tube of the furnace, silicon is obtained in the form of a pourable crystal agglomerate containing <0.5 ppm of boron and <1 ppm of phosphorus.

EXAMPLE 5

Coarse aluminum powder is poured into a vertically placed quartz tube equipped with a frit and the powder is heated to a temperature of 550° C. under nitrogen. $SiCl_4$ is then passed into the stream of nitrogen through an evaporator and the supply of nitrogen is restricted so that a gas mixture of about 20% $N_2$ and 80% $SiCl_4$ is obtained. After a period of 3 hours during which the temperature is continuously raised to 650° C., the conversion of aluminum is virtually quantitative and the reactor contents consist of a slightly baked crystal cake of silicon having a boron content of <0.5 ppm and a phosphorus content of <1 ppm.

It will be appreciated that the instant specification and examples are set forth by way of illustration and not limitation, and that various modification and changes may be made without departing from the spirit and scope of the present invention.

What is claimed is:

1. A process for the production of silicon comprising reacting a gaseous silicon compound of the formula $SiH_nX_{4-n}$, wherein X is selected from the group consisting of fluorine, chlorine, bromine and iodine and n is 0 to 3, with aluminum in a reactor at an elevated temperature at which by product $AlX_3$ is in vapor state so that the reactor at all times contains only gases and solids.

2. A process according to claim 1, wherein the temperature is from about 500° to 660° C.

3. A process according to claim 1, wherein the temperature is from about 550° to 650° C.

4. A process according to claim 1, wherein the silicon compound is silicon tetrachloride.

5. A process according to claim 1, wherein the aluminum is finely divided and has a specific surface area of more than about 0.05 m²/g.

* * * * *